(12) United States Patent
Majdali et al.

(10) Patent No.: US 12,703,284 B2
(45) Date of Patent: Aug. 11, 2026

(54) SYSTEMS AND METHODS FOR ADJUSTING A SEAT PAN FOR A RIDE VEHICLE SEAT

(71) Applicant: Universal City Studios LLC, Universal City, CA (US)

(72) Inventors: David Gerard Majdali, Orlando, FL (US); Steven C. Blum, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 110 days.

(21) Appl. No.: 18/545,875

(22) Filed: Dec. 19, 2023

(65) Prior Publication Data

US 2025/0196745 A1 Jun. 19, 2025

(51) Int. Cl.

*A47C 31/12* (2006.01)
*A63G 7/00* (2006.01)
*B60N 2/90* (2018.01)
*A63G 21/12* (2006.01)

(52) U.S. Cl.

CPC ............... *B60N 2/914* (2018.02); *A63G 7/00* (2013.01); *A47C 31/126* (2013.01); *A63G 21/12* (2013.01)

(58) Field of Classification Search

CPC ................................ A47C 31/126; A63G 7/00
See application file for complete search history.

(56) References Cited

U.S. PATENT DOCUMENTS 6,220,171 B1 4/2001 Hettema et al.
6,623,080 B2 * 9/2003 Clapper ................ A47C 27/18 297/452.41
7,758,121 B2 7/2010 Browne et al.
8,424,832 B2 * 4/2013 Robbins ............ B64D 11/0619 296/65.01
9,283,875 B1 * 3/2016 Pellettiere .......... B60N 2/42727
9,463,728 B2 10/2016 Lee et al.
10,017,082 B2 * 7/2018 Zwaan .................. B60N 2/502
10,486,562 B2 * 11/2019 Sharif .................. B60N 2/4279
11,036,391 B2 * 6/2021 Hall .................. H04M 1/72427
11,058,962 B1 * 7/2021 Henley .................. A63G 27/04

(Continued)

FOREIGN PATENT DOCUMENTS

CN 105216660 A * 1/2016 ............... B60N 2/70
CN 108528297 A * 9/2018 ............ B60Q 9/008

(Continued)

OTHER PUBLICATIONS

PCT/US2024/060583 International Search Report and Written Opinion mailed Mar. 21, 2025.

(Continued)

*Primary Examiner* — Timothy J Brindley

(74) *Attorney, Agent, or Firm* — Fletcher Yoder, P.C.

(57) ABSTRACT

A ride vehicle system includes a seat configured to support a passenger in a ride vehicle. The seat includes a seat pan, and the seat pan includes a membrane defining an internal volume and an active fluid disposed within the internal volume. Additionally, the ride vehicle system includes a field generator configured to generate an applied field in the active fluid to change a property of the active fluid. The seat pan is configured to deform under a weight of the passenger to form a contour conformed to a shape of the passenger in an absence of the applied field.

20 Claims, 5 Drawing Sheets

(56) References Cited

U.S. PATENT DOCUMENTS

| | | | | |
|---|---|---|---|---|
| 11,312,278 | B2 | 4/2022 | Mazzucchelli | |
| 11,491,895 | B2 | 11/2022 | Mizoi et al. | |
| 11,884,192 | B1 * | 1/2024 | Choin | B60Q 3/233 |
| 2010/0036567 | A1 | 2/2010 | Gandhi | |
| 2016/0001688 | A1 | 1/2016 | Lee et al. | |
| 2019/0070986 | A1 | 3/2019 | Sharif et al. | |
| 2020/0238874 | A1 | 7/2020 | Mazzucchelli | |
| 2020/0282878 | A1 | 9/2020 | Gandhi et al. | |
| 2022/0203868 | A1 | 6/2022 | Hsu | |
| 2022/0305971 | A1 | 9/2022 | Makiguchi et al. | |

FOREIGN PATENT DOCUMENTS

| | | | | | |
|---|---|---|---|---|---|
| CN | 113696802 | A | * | 6/2022 | B60N 2/42736 |
| CN | 114604340 | A | * | 6/2022 | B62J 1/00 |
| DE | 10065464 | A1 | * | 8/2001 | B60N 2/4279 |
| DE | 102017216410 | A1 | * | 3/2019 | B60N 2/0034 |
| DE | 102018008616 | A1 | | 5/2019 | |
| DE | 102024000268 | A1 | * | 5/2024 | B60R 16/037 |
| JP | 2021054309 | A | * | 4/2021 | |
| KR | 102180965 | B1 | | 11/2020 | |
| KR | 20220142635 | A | * | 10/2022 | A61H 23/0254 |

OTHER PUBLICATIONS

Humphries, Matthew, Toyota Created a Shape-Changing Car Seat, Nov. 27, 2017, pp. 1-8, https://www.pcmag.com/news/toyota-created-a-shape-changing-car-seat.

* cited by examiner

SYSTEMS AND METHODS FOR ADJUSTING A SEAT PAN FOR A RIDE VEHICLE SEAT

BACKGROUND

The present disclosure relates generally to the field of amusement parks. More specifically, embodiments of the present disclosure relate to systems and methods for adjusting a seat pan for a ride vehicle seat.

Amusement parks and other entertainment venues may include a ride with a ride vehicle that carries passengers along a ride path, for example, a track. Passengers may be situated in seats of the ride vehicle as the ride vehicle progresses along the ride path through various features, such as tunnels, turns, ascents, descents, loops, and so forth. As a result, the passengers may be subjected to forces that may move them out of proper positioning or orientation in the seats of the ride vehicle. As such, it is desirable to comfortably restrain and contain the passengers in the seats of the ride vehicle while the ride is in operation.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, a ride vehicle system includes a seat configured to support a passenger in a ride vehicle. The seat includes a seat pan, and the seat pan includes a membrane defining an internal volume and an active fluid disposed within the internal volume. Additionally, the ride vehicle system includes a field generator configured to generate an applied field in the active fluid to change a property of the active fluid. The seat pan is configured to deform under a weight of the passenger to form a contour conformed to a shape of the passenger in an absence of the applied field In an embodiment, a ride vehicle system includes a ride vehicle and a seat having a seat pan configured to support a passenger within the ride vehicle. The seat pan is configured to change plasticity based on a voltage applied to the seat pan. Additionally, the ride vehicle system includes a control system configured to control the voltage applied to the seat pan.

In an embodiment, a ride vehicle system includes a field generator configured to generate an electric field or a magnetic field. Additionally, the ride vehicle system includes a seat configured to support a passenger in a ride vehicle. The seat includes a seat pan configured to stiffen in response to exposure to the electric field or the magnetic field and soften in absence of the electric field or the magnetic field. Additionally, the ride vehicle system includes control circuitry configured to determine a ride status of the ride vehicle system and instruct the field generator to generate the electric field or the magnetic field based on the ride status of the ride vehicle system.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
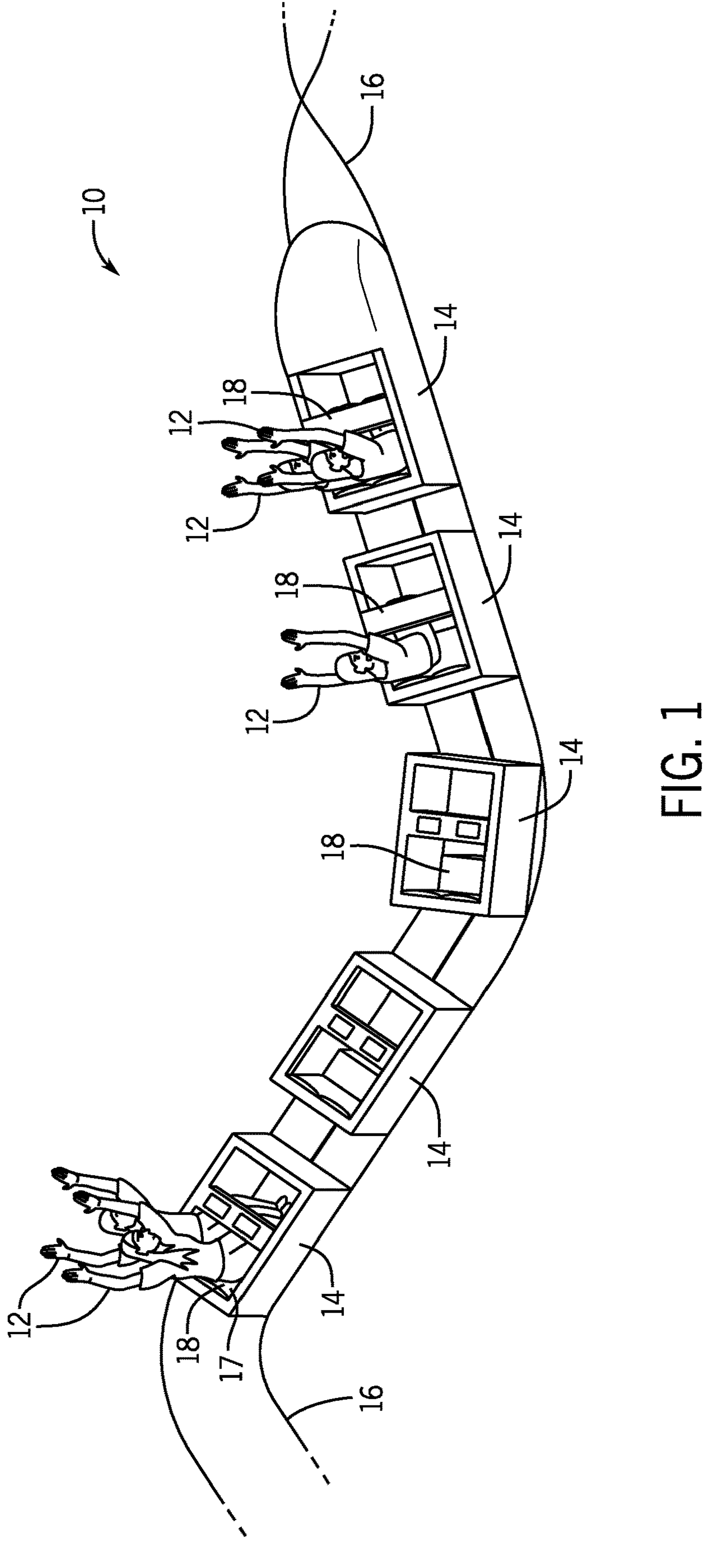
FIG. 1 is a side perspective view of an embodiment of a ride system, in accordance with aspects of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to “one embodiment” or “an embodiment” of the present disclosure are not intended to be interpreted as excluding the existence of additional embodiments that also incorporate the recited features.

As used herein, the terms “approximately,” “generally,” “substantially,” and so forth, are intended to convey that the property value being described may be within a relatively small range of the property value, as those of ordinary skill would understand. For example, when a property value is described as being “approximately” equal to (or, for example, “substantially similar” to) a given value, this is intended to convey that the property value may be within at least +/−5%, within +/−4%, within +/−3%, within +/−2%, within +/−1%, or even closer, of the given value. Similarly, when a given feature is described as being “substantially parallel” to another feature, “generally perpendicular” to another feature, and so forth, this is intended to convey that the given feature is within at least +/−5%, within +/−4%, within +/−3%, within +/−2%, within +/−1%, or even closer, to having the described nature, such as being parallel to another feature, being perpendicular to another feature, and so forth. Mathematical terms, such as “parallel” and “perpendicular,” should not be rigidly interpreted in a strict mathematical sense, but should instead be interpreted as one of ordinary skill in the art would interpret such terms. For example, one of ordinary skill in the art would understand that two lines that are substantially parallel to each other are parallel to a substantial degree, but may have minor deviation from exactly parallel, such as to account for manufacturing tolerances.

Amusement parks and other entertainment venues include attractions that provide experiences for guests (e.g., patrons, users). For example, an attraction may include a ride with one or more ride vehicles that follow a ride path, such as a track, through a series of features. As such, ride vehicle seats frequently include features to restrain and contain passengers in the ride vehicle seats while the ride vehicle is operating and throughout a duration of a ride experience. As will be appreciated, passengers of various ages, sizes, and proportions may wish to enjoy the ride experience. Accordingly, it may be desirable for the ride vehicle seats to adjust to accommodate passengers of a wide variety of body types, shapes, and sizes.

With the foregoing in mind, systems described herein relate generally to a seat pan for a ride vehicle seat of a ride system. The seat pan may be disposed in the ride vehicle seat and configured to closely conform to a wide variety of body types, shapes, and sizes. In other words, the seat pan is adaptable and adjustable in shape and contour to enable accommodation of differently shaped ride passengers. The seat pan may have a controllable plasticity. For example, in a soft state, the seat pan may be highly flexible to conform around a portion of a passenger. The seat pan may be controlled to switch to a firm state, in which the seat pan stiffens to maintain a shape of the seat pan. For example, after the seat pan assumes a conformed shape around the portion of the passenger in the soft state, the seat pan may enter the firm state to maintain the conformed shape and thereby provide firm support against the portion of the passenger.

In an embodiment, the plasticity of the seat pan may be controlled based on an applied field (e.g., an electric field) applied to the seat pan. For example, the seat pan may include a membrane that defines an interior volume containing an electrorheological (ER) fluid whose viscosity varies based on the electric field. When the seat pan is subject to little or no electric field, the ER fluid may have a low viscosity. As a result, the shape of the seat pan may easily conform to pressure applied over the membrane, such as due to contact with a body of a passenger and a weight of the passenger. Indeed, when the ER fluid is deactivated, the seat pan may be in a soft state, and the membrane, being flexible, may conform around the body of the passenger as the ER fluid within the membrane is displaced under the weight of the passenger. On the other hand, when the ER fluid is activated (e.g., when an electric field is applied), the viscosity of the ER fluid may be increased. As a result, the seat pan may enter a firm state in which the ER fluid is more resistant to flow, causing the seat pan to retain its shape more readily than in the soft state.

In an embodiment, the seat pan may be filled with a magnetorheological (MR) fluid whose viscosity varies based on the applied field (e.g., a magnetic field) applied to the MR fluid. In the soft state of the seat pan, little or no magnetic field may be applied to the MR fluid, and the MR fluid may flow within the membrane with low viscosity. In the firm state, the MR fluid is activated by exposure to a magnetic field, which causes the MR fluid to resist flow within the membrane. As a result, the seat pan may stiffen and hold its shape around the body of the passenger, thereby firmly supporting and/or containing the passenger in the seat.

In the soft state, displacement of the ER/MR fluid by the weight of the passenger may cause a portion of the seat pan to rise between the passenger’s legs, forming a pommel. In the firm state, the pommel may persist as a firm structure, even as the weight of the passenger shifts (e.g., during acceleration and deceleration of the ride vehicle). Thus, the seat pan is configured to produce a custom-shaped, adjustable pommel for the ride vehicle seat.

Turning now to the drawings, FIG. 1 depicts a side perspective view of an embodiment of a ride system 10. The ride system 10 may include a ride vehicle 14 that holds a number of passengers 12 (e.g., one or more passengers). The ride vehicle 14 may include a motion base (e.g., a platform or an active support with one or more degrees of freedom) that generates movement to create a thrilling or immersive experience for the passengers 12. In one embodiment, the ride vehicle 14 may travel along or about a ride path 16. In one embodiment, multiple ride vehicles 14 may be coupled (e.g., by one or more linkages) and travel together along or about the ride path 16. The ride path 16 may be any surface on which the ride vehicle 14 travels. In the illustrated embodiment, the ride path 16 is a two-rail track. However, the illustrated ride path 16 may be representative of any of various different types of ride paths 16 (e.g., a single rail, an overhead rail, trackless flooring, or grooves). The ride path 16 may or may not dictate a route or path traveled by the ride vehicle 14. That is, in one embodiment, the ride path 16 may control the movement (e.g., direction, speed, and/or orientation) of the ride vehicle 14 as it progresses, similar to a train on train tracks. In another embodiment, there may be a system for controlling the route or path taken by the ride vehicle 14. For example, the ride path 16 may be an open surface that allows the passengers 12 to control certain aspects of the movement of the ride vehicle 14 via a control system resident on the ride vehicle 14. Alternatively or additionally, the control system may be resident on the open surface, such that the passenger 12 may control features on the open surface to maneuver the ride vehicle 14 at a target trajectory.

Furthermore, the ride system 10 may include any number of ride vehicles 14, such as one, two, three, four, five, ten, twenty, or more ride vehicles 14, that travel individually (e.g., each of the ride vehicles 14 travels independently along the ride path 16) or together (e.g., in one or more groups; physically or virtually linked to form one or more trains or connected series of ride vehicles 14 that travel along the ride path 16). Each ride vehicle 14 may accommodate any number of passengers 12, such as one, two, three, four, or more passengers 12. For example, the illustrated embodiment shows five ride vehicles 14 that each accommodate two passengers 12. It should be appreciated that each ride vehicle 14 may accommodate various numbers of passengers 12. For example, a first ride vehicle 14 may accommodate one passenger, a second ride vehicle 14 may accommodate four passengers 12, a third ride vehicle 14 may accommodate six passengers 12, and further ride vehicles 14 may accommodate any suitable numbers of passengers 12. As discussed in detail herein, each ride vehicle 14 may contain one or more rider engagement systems 17, which may include seat pans 18. For a respective seat pan 18, the passenger 12 may sit on the seat pan 18, whereupon the weight of the passenger 12 causes a portion of the seat pan 18 to rise between legs of the passenger 12, such that the seat pan 18 engages with each leg of the passenger 12 (e.g., contacts; in a frictional engagement) to aid in securing the passenger 12 to the rider engagement system 17 of the ride vehicle 14.

It should be appreciated that the embodiment of the ride system 10 illustrated in FIG. 1 is a simplified representation intended to provide context and facilitate discussion of the presently disclosed techniques. Other embodiments of the ride system 10, including the ride vehicle 14, the ride path 16, the seat pan 18, and so forth may include similar and/or different elements or configurations.

Figures 2, 3, 4:
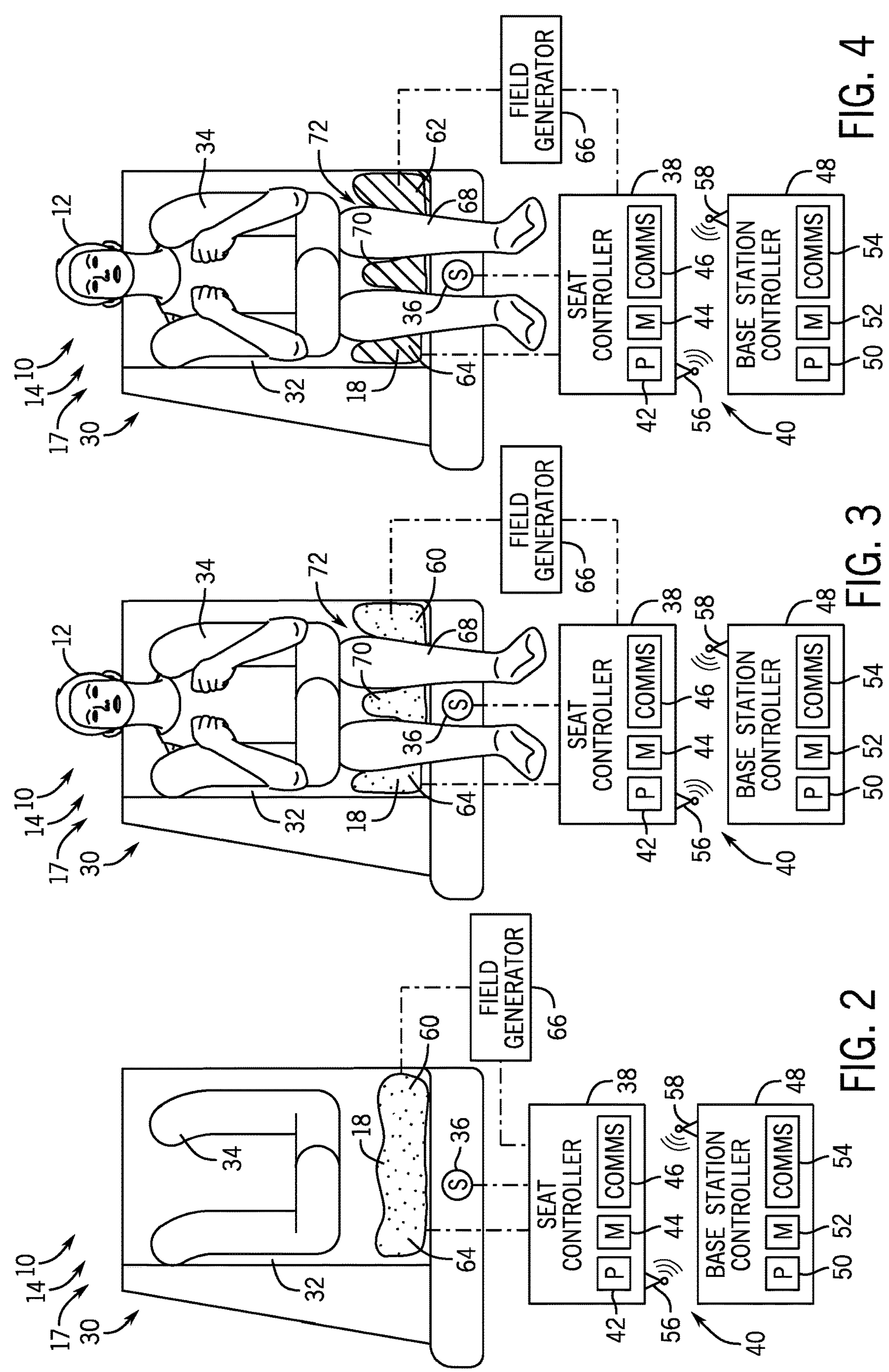
FIG. 2 is a schematic view of an embodiment of a rider engagement system that may be used in the ride system of FIG. 1, wherein a ride vehicle seat is unoccupied, in accordance with aspects of the present disclosure.
FIG. 3 is a schematic view of the rider engagement system of FIG. 2, wherein the ride vehicle seat is occupied and a seat pan is in a soft state, in accordance with aspects of the present disclosure.
FIG. 4 is a schematic view of the rider engagement system of FIG. 2, wherein the ride vehicle seat is occupied and the seat pan is in a firm state, in accordance with aspects of the present disclosure.

FIGS. 2-4 are schematics of an embodiment of the rider engagement system 17 including the seat pan 18 that may be used in the ride system 10 of FIG. 1. The rider engagement system 17 may include a ride vehicle seat 30, which may include a seat back 32, a restraint system 34, and/or the seat pan 18. The seat back 32 and the seat pan 18 may enable comfortable accommodation of the passenger 12 when seated. The restraint system 34 may operate to restrain the passenger 12 within the ride vehicle seat 30. As disclosed herein, the seat pan 18 may be configured to transition between varying degrees of plasticity or stiffness to conform to a body of the passenger 12 and to maintain a shape of the seat pan 18 once conformed.

In one embodiment, the ride vehicle 14 and/or the ride vehicle seat 30 may be equipped with a sensor(s) 36, which may be representative of any number of sensors and sensor types. The sensor(s) 36 may be integrated in the ride vehicle seat 30, the seat back 32, the seat pan 18, and/or anywhere else on the ride vehicle 14. In an embodiment, the sensor(s) 36 is configured to detect a presence of the passenger 12 in the ride vehicle seat 30, the weight of the passenger 12 in the ride vehicle seat 30, and/or contact with the seat pan 18 by the passenger 12 in the ride vehicle seat 30. The sensor(s) 36 may include a passenger condition sensor (e.g. a pressure sensor, a weight sensor, a force sensor, a motion sensor, an image sensor, a touch sensor) used to measure the passenger's condition (e.g., physical condition, height, weight, shape, size) and provide feedback to a seat controller 38 indicating the passenger's condition. The sensor(s) 36 may measure a force acting upon the seat pan 18, such as the weight of the passenger 18, a centripetal force of the ride vehicle 14, and/or a g-force experienced by the passenger 18. Additionally, the sensor(s) 36 may include an inertial measurement unit (e.g., accelerometer) configured to determine an orientation and/or acceleration of the passenger 12 and/or the ride vehicle 14. Based on data (e.g., acceleration data) from the sensor(s) 36, the seat controller 38 may control a stiffness of the seat pan 18.

In one embodiment, the rider engagement system 17 may include a control system 40. The control system 40 may include the seat controller 38, which may be representative of a single controller or multiple separate controllers cooperating together (e.g., operating together as a unit). In one embodiment, the seat controller 38 may be a central controller that controls numerous rider engagement systems 17 (e.g., all rider engagement systems 17 for all ride vehicle seats 30 in one ride vehicle 14). In another embodiment, the seat controller 38 may control one rider engagement system 17 (e.g., each rider engagement system 17 for each ride vehicle seat 30 has a dedicated seat controller 38). The seat controller 38 may include one or more processors 42, memory 44, and one or more communication systems 46 (e.g., communication circuitry).

Additionally, the rider engagement system 17 may include or be communicatively coupled to a base station controller 48 that may facilitate control of the control system 40. The base station controller 48 may represent one or more controllers, such as a single controller operating alone or multiple controllers operating together. The base station controller 48 may include one or more processors 50, memory 52, and one or more communication systems 54. In one embodiment, the seat controller 38 and the base station controller 48 may be communicatively coupled via respective transmitters, receivers, and/or transceivers (e.g., transceiver 56 and transceiver 58) that enable wireless communication across any suitable protocol. In another embodiment, the seat controller 38 and the base station controller 48 are communicatively coupled via a wired (e.g., landline, fiberoptic cable(s)) connection. The seat controller 38 and/or the base station controller 48 may serve as a quality check point, whereby conditions of the rider engagement system 17 are monitored. For example, the base station controller 48 may receive data from the seat controller 38 and/or the sensor 36 on the ride vehicle seat 30, on the seat pan 18, or the like. Such data may be utilized to determine force being applied to the seat pan 18, whether the seat pan 18 is in a soft state 60 (e.g., FIGS. 2 and 3) or a firm state 62 (e.g., FIG. 4), and/or whether the seat pan 18 may be actuated (e.g., whether a ride status allows for adjustment of the seat pan 18). Furthermore, an operator of the base station controller 48 may manually control the rider engagement system 17 and instruct the seat pan 18 to enter the soft state 60 or the firm state 62.

The processor 42 of the seat controller 38 and/or the processor 50 of the base station controller 48 may be used to execute software, such as software for controlling the stiffness of the seat pan 18. Furthermore, the processor 42 and/or the processor 50 may determine a start time and an end time associated with a ride (e.g., a ride stage; between loading and unloading of the passenger 12 onto the ride vehicle 14) that utilizes the rider engagement system 17. The processor 42 and/or the processor 50 may be any type of computer processor or microprocessor capable of executing computer-executable code. The processor 42 and/or the processor 50 may also include multiple processors that perform the operations described herein (e.g., form a processing system or control circuitry with multiple processors, wherein one processor performs a first operation, a second processor performs a second operation, and so on to perform the operations described herein).

The memory 44 of the seat controller 38 and/or the memory 52 of the base station controller 48 may include a volatile memory, such as random access memory (RAM), and/or a nonvolatile memory (ROM). The memory 48 and/or the memory 52 may store a variety of information and may be used for various purposes. For example, the memory 44 may store processor-executable instructions, such as instructions for controlling components of the ride vehicle 14. The memory 44 and/or the memory 52 may also include flash memory, or any suitable optical, magnetic, or solid-state storage medium, or a combination thereof. The memory 44 and/or the memory 52 may store data, instructions (e.g., software or firmware for controlling the configuration of the seat pan 18), and any other suitable information.

The communications system 46 of the seat controller 38 and/or the communications system 54 of the base station controller 48 may be a wired or wireless communication component that may facilitate communication between the seat controller 38 and the base station controller 48, and/or various other computing systems via the transceiver 56 and the transceiver 58 or via a network (e.g., via Internet, Bluetooth, Wi-Fi).

In an embodiment, the seat pan 18 may include (e.g., contain) an active fluid 64, such as an ER fluid or an MR fluid. Material properties of the active fluid 64 may enable the active fluid 64 to change viscosity and/or plasticity when exposed to an applied field (e.g., electric, magnetic, and/or electromagnetic) field. For example, when the active fluid 64 is not exposed to an electric field or a magnetic field, the viscosity of the active fluid 64 may be low. The active fluid 64 may become increasingly viscous as an intensity (e.g., flux) of the electric field or the magnetic field passing through the active fluid 64 increases. To harness such rheological effects, the ride vehicle seat 30 may include a field generator 66 configured to generate and/or modulate the applied field, such that the active fluid 64 is exposed to the applied field. The field generator 66 may include a voltage source to create the electric field or to energize an electromagnet to create the magnetic field. The control system 40 (e.g., seat controller 38, base station controller 48) may control the field generator 66 to activate, deactivate, and/or modulate the applied (e.g., electric and/or magnetic) field passing through the active fluid 64. As a result, the viscosity of the active fluid 64 may be controlled. As disclosed herein, regulating the viscosity of the active fluid 64 may enable control of the stiffness (e.g., plasticity) of the seat pan 18. As a result, the seat pan 18 may transition between a range of stiffnesses, including the soft state 60 and the firm state 62.

FIGS. 2-4 each illustrate a different condition under which the rider engagement system 17 may operate. In FIG. 2, no passenger 12 is seated in the ride vehicle seat 30. For example, the ride system 10 may be in an inactive state in which the ride vehicle 14 is not in motion. The inactive state may be a boarding phase of the ride system 10, during which the passenger 12 is in the process of being seated in the ride vehicle 14. As another example, the ride system 10 may be in an active state in which the ride vehicle 14 is in motion, and the ride vehicle seat 30 happens to be unoccupied. In any case, when the ride vehicle seat 30 is unoccupied, or when no weight is seated on the seat pan 18 (e.g., as detected by the sensor(s) 36 and indicated by data from the sensor(s) 36), the seat pan 18 may be in the soft state 60 by default. In the soft state 60, the seat pan 18 may be relatively deformable, such that a pressure applied to the seat pan 18 would mold the seat pan 18 to conform to a profile of the pressure. While no pressure is applied, as shown in FIG. 2, the seat pan 18 may be relatively flat or otherwise non-distinct in contour across a sitting surface (e.g., upper surface) of the seat pan 18. The control system 40 (e.g., seat controller 38 and/or base station controller 48) may adjust the plasticity of a material of the seat pan 18 to ensure that the seat pan 18 is conformable. In an embodiment, the base station controller 48 may instruct the seat controller 38 to configure the seat pan 18 in the soft state 60 based on data from the sensor(s) 36, ride conditions, a ride status of the ride vehicle 14, a timed schedule, and so forth. Thus, the seat pan 18 may be in the soft state 60 and not conformed to a particular shape.

In FIG. 3, the passenger 12 is seated on the seat pan 18 in the soft state 60. Because the seat pan 18 is relatively plastic in the soft state 60, the weight of the passenger 12 may cause the seat pan 18 to conform around a portion of the body (e.g., buttocks, legs) of the passenger 12. That is, the passenger may “sink” into the seat pan 18, such that the seat pan 18 is molded to a shape of the passenger 12. As a result, a portion of the seat pan 18 may rise between legs 68 of the passenger to form a pommel 70. While the seat pan 18 is in the soft state 60, the conformed shape of the seat pan 18 may be dynamic and change in response to the weight of the passenger 12 shifting in the ride vehicle seat 30. That is, although the seat pan 18 may conform to the shape of the passenger 12, the shape of the seat pan 18 is not rigidly fixed to constrain or support the body of the passenger 12 in the soft state 60. The passenger 18 may be seated on the seat pan 18 in the soft state 60 during the inactive state of the ride system 10, such as during a boarding phase or a deboarding phase.

In FIG. 4, the seat pan 18 is stiffened to produce the firm state 62. It should be understood that activating the firm state 62 may refer to stiffening the seat pan 18 within a range (e.g., continuous range) of stiffness. That is, the soft state 60 and the firm state 62 may not represent exclusively binary states, but may instead gauge the quality of stiffness in a relative gradation of possible stiffness. Thus, to adjust from the soft state 60 to the firm state 62 should be understood to mean generally stiffening the seat pan 18 relative to an initial stiffness.

The control system 40 may stiffen the seat pan 18 (e.g., activate the firm state 62) based on the data from the sensor(s) 36, ride conditions, a ride status of the ride vehicle 14, a timed schedule, and so forth. Specifically, the control system 40 may stiffen the seat pan 18 when more support and/or restraint around the passenger 12 is desired. For example, the control system 40 may activate the firm state 62 when the ride system is in an active (e.g., moving, movable) phase or is about to enter the active phase (e.g., within a period of time, such as within 5, 10, 30, or 60 seconds; based on known or planned ride schedules for the ride vehicle 14). Additionally, the control system 40 may activate the firm state 62 in response to the velocity or acceleration of the ride vehicle 14 exceeding a threshold velocity or acceleration (e.g., zero) or when such velocity or acceleration is about to occur (e.g., within a period of time, such as within 5, 10, 30, or 60 seconds; based on known or planned routes for the ride vehicle 14). In an embodiment, the control system 40 may adjust the stiffness of the seat pan 18 based on certain features (e.g., hard turns, loops) or events associated with a position and/or elapsed time of the ride vehicle 14 within a ride environment (e.g., along the ride path 16). For example, the base station controller 48 may monitor a position (e.g., via a location sensor) and/or elapsed time of the ride vehicle 14 and, at certain spatial and/or temporal checkpoints, instruct the seat controller 38 to switch or adjust the seat pan 18 between the soft state 60, the firm state 62, and any stiffness value therebetween. Thus, the seat pan 18 may adjust in this way at any suitable portion of a ride cycle, such as at the boarding phase, at the deboarding phase, during the ride stage between the boarding phase and the deboarding phase, when stationary, and/or when in motion (e.g., along the ride path).

In the firm state 62, the seat pan 18 may more rigidly support and secure the passenger 12 within the ride vehicle seat 30. For example, the conformed shape of the seat pan 18, as previously formed in the soft state 60, may include the pommel 70, as well as concavities 72 molded in the shape of the legs 68, buttocks, and/or back of the passenger 12. When the seat pan 18 stiffens in the firm state 62, the pommel 70 and walls of the concavities 72 may provide more rigid lateral support for the body of the passenger 12 (e.g., against leaning of the passenger 12 to the left, right, front, and/or back). Additionally, the conformed shape of the seat pan 18 in the firm state 62 may provide increased resistance (e.g., friction) against sliding within the ride vehicle seat 30. In this way, the passenger 12 may feel more comfortable and secure in the ride vehicle seat 30, even as the passenger 12 experiences significant acceleration throughout the ride.

In some embodiments, the seat pan 18 may be in the firm state 62 when no passenger 12 is seated in the ride vehicle seat 30. For example, the seat controller 38 may be a central controller instructing numerous seat pans 18 to adjust stiffness, even while some of the numerous seat pans 18 are unoccupied. Alternatively, each seat pan 18 may be associated with its separate respective seat controller 38, and the base station controller 48 may instruct each of the separate controllers 38 to adjust the stiffness of the seat pans 18, even while some of the seat pans 18 are unoccupied. When the seat pan 18 is unoccupied in the firm state 62, the seat pan 18 may have the same shape as the unoccupied seat pan 18 in the soft state 60 (e.g., FIG. 2), without the concavities 72 and the pommel 70.

At the end of the ride, the seat pan 18 may revert to the soft state 60, and the passenger 12 may exit the rider engagement system 17. The seat pan 18 may revert to the soft state 60 before or after the passenger 12 gets up from the seat pan 18 (e.g., breaks contact with the seat pan 18). Then, the seat pan 18 may be unoccupied in the soft state 60 until a new passenger 12 enters the ride vehicle seat 30 for a subsequent ride cycle. When the new passenger 12 sits in the seat pan 18, the seat pan 18 may conform around the body of the new passenger 12 to form a new conformed shape different from the previous conformed shape of the previous passenger 12. In this way, the seat pan 18 may cycle between stiffness states during and/or in between ride cycles and accommodate different passengers 12 (e.g., in a comfortable, dynamic, and/or personalized manner) over multiple ride cycles.

Figure 5:
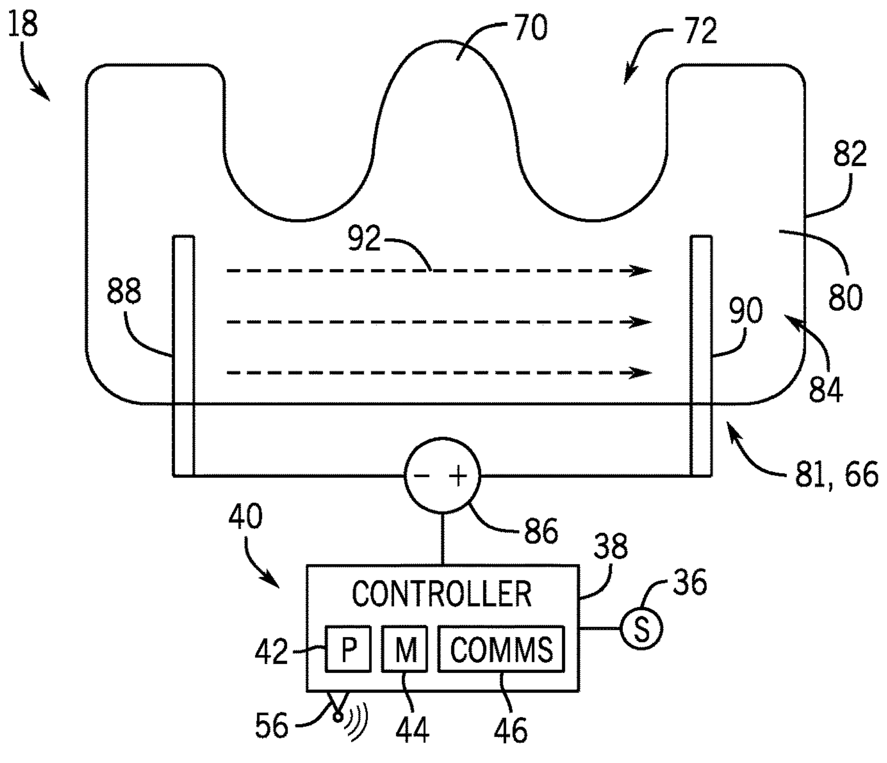
FIG. 5 is a schematic view of an embodiment of a seat pan of a rider engagement system that may be used in the ride system of FIG. 1, wherein the seat pan has an electrorheological (ER) fluid, in accordance with aspects of the present disclosure.

FIG. 5 is a schematic view of an embodiment of the seat pan 18 utilizing the field generator 66 and an ER fluid 80 to achieve voltage-dependent plasticity of the seat pan 18. As shown, the seat pan 18 includes the concavities 72 and the pommel 70. For clarity of illustration, the passenger 12 (e.g., legs 68) is not shown in FIG. 5, but may be understood with reference to FIG. 4. The seat pan 18 includes a membrane 82 enclosing an internal volume 84 of the seat pan 18. The membrane 82 may be resilient (e.g., elastic, flexible) such that the or shape of the internal volume 84 changes depending on pressure (e.g., external applied pressure and internal fluid pressure) exerted against the membrane 82.

The ER fluid 80 is contained within the internal volume 84. An external pressure exerted on the membrane 82 may deform the membrane 82 and displace the ER fluid 80. The ER fluid 80 may include electrically active particles suspended in a base fluid (e.g., electrically insulating fluid). Certain material properties (e.g., viscosity, viscoelasticity, thickness, consistency, plasticity) of the ER fluid 80 vary based on exposure to an electric field. For example, when no electric field is present, the ER fluid 80 may be non-viscous, flowing freely within the internal volume 84. However, when the ER fluid 80 is exposed to an electric field, the ER fluid 80 may exhibit increased viscosity.

The seat controller 38 may control the stiffness of the seat pan 18 by generating and/or controlling an electric field in the ER fluid 80 using an electric field generator 81 (e.g., as an embodiment of the field generator 66). For example, the electric field generator 81 may include a voltage source 86 (e.g., DC power supply, AC power supply, battery) configured to establish a voltage between a first lead 88 (e.g., first plate, first wire) and a second lead 90 (e.g., second plate, second wire) extending through the ER fluid 80. The potential difference between the first lead 88 and the second lead 90 produces an electric field 92 through the ER fluid 80. The seat controller 38 may turn the voltage source 86 on and off to switch between the soft state 60 and the firm state 62. Additionally, the seat controller 38 may modulate the voltage of the electric field generator 81 to adjust a magnitude of the electric field 92 and thereby change the viscosity of the ER fluid 80 and the stiffness of the seat pan 18.

As the viscosity of the ER fluid 80 increases, an external pressure (e.g., weight of the passenger 12) may displace the ER fluid 80 to a lesser degree. As a result, the seat pan 18 may resist deformation and behave closer to a rigid body when a force is exerted upon the membrane 82. In this way, the seat pan 18 may maintain a contour (e.g., a conformed shape) molded to match the body of the passenger 12. The molded contour includes the concavities 72 and the pommel 70. When the weight of the passenger 12 shifts (e.g., due to acceleration of the ride vehicle 14), the seat pan 18 may provide reaction forces against the shifting weight and thus support, stabilize, and secure the passenger 12 within the molded contour formed in the seat pan 18.

Figure 6:
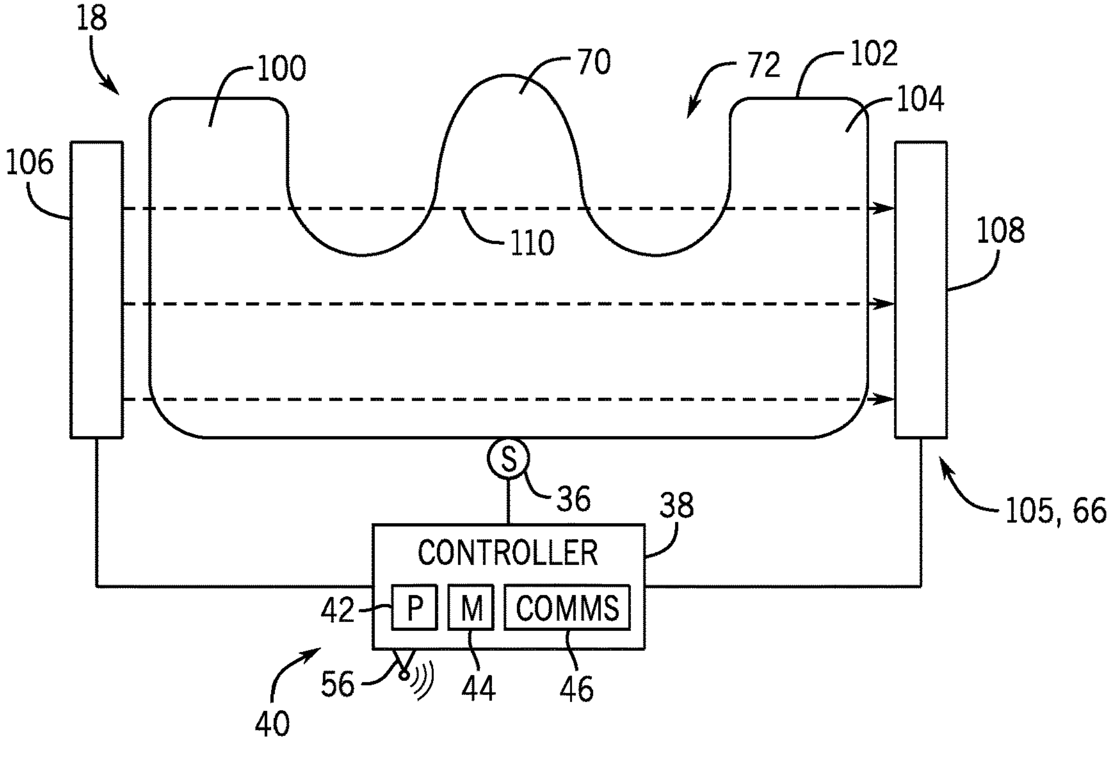
FIG. 6 is a schematic view of an embodiment of a seat pan of a rider engagement system that may be used in the ride system of FIG. 1, wherein the seat pan has a magnetorheological (MR) fluid, in accordance with aspects of the present disclosure.

FIG. 6 is a schematic view of an embodiment of the seat pan 18 utilizing the field generator 66 and an MR fluid 100 to control the plasticity of the seat pan 18. As shown, the seat pan 18 includes the concavities 72 and the pommel 70. For clarity of illustration, the passenger 12 (e.g., legs 68) is not shown in FIG. 6, but may be understood with reference to FIG. 4. The seat pan 18 includes a membrane 102 enclosing an internal volume 104 of the seat pan 18. The membrane 102 may be resilient (e.g., elastic, flexible) such that the or shape of the internal volume 104 changes depending on pressure (e.g., external applied pressure and internal fluid pressure) exerted against the membrane 102.

The MR fluid 100 is contained within the internal volume 104. An external pressure exerted on the membrane 102, may deform the membrane 102 and displace the MR fluid 100. The MR fluid 100 may include magnetic particles suspended in a base fluid (e.g., electrically insulating fluid). Certain material properties (e.g., viscosity, viscoelasticity, thickness, consistency, plasticity) of the MR fluid 100 vary based on exposure to a magnetic field. For example, when no magnetic field is present, the MR fluid 100 may be non-viscous, flowing freely within the internal volume 104. However, when the MR fluid 100 is exposed to a magnetic field, the MR fluid 100 may exhibit increased viscosity.

The seat controller 38 may control the stiffness of the seat pan 18 by generating and/or controlling a magnetic field through the MR fluid 100 using a magnetic field generator 105 (e.g., as an embodiment of the field generator 66). For example, the magnetic field generator 105 may include a first electromagnet 106 disposed at a first end of the seat pan 18 and a second electromagnet 108 disposed at a second end of the seat pan 18. The seat controller 38 may instruct the magnetic field generator 105 to energize the first electromagnet 106 and the second electromagnet 108 to produce a magnetic field 110 through the MR fluid 100. Additionally, the seat controller 38 may instruct the magnetic field generator 105 to modulate current through the first electromagnet 106 and the second electromagnet 108 to adjust a magnitude of the magnetic field 110 and thereby change the viscosity of the MR fluid 100 and the stiffness of the seat pan 18. In an embodiment, the magnetic field generator 105 may not include the second electromagnet 108, as the first electromagnet may be sufficient to produce the magnetic field 110. In an embodiment, the rider engagement system 17 may include one or more permanent magnets to produce the magnetic field 110 (e.g., instead of the first electromagnet 106 and the second electromagnet 108). The control system 40 may control an actuator to adjust a position of the one or more permanent magnets relative to the MR fluid to change an intensity (e.g., flux) of the magnetic field 110 through the MR fluid.

As the viscosity of the MR fluid 100 increases, an external pressure (e.g., weight of the passenger 12) may displace the MR fluid 100 to a lesser degree. As a result, the seat pan 18 may resist deformation and behave more similarly to a rigid body when a force is exerted upon the membrane 102. In this way, the seat pan 18 may maintain a contour molded (e.g., conformed shape) to match the body of the passenger 12. The molded contour includes the concavities 72 and the pommel 70. When the weight of the passenger 12 shifts (e.g., due to acceleration of the ride vehicle 14), the seat pan 18 may provide reaction forces against the shifting weight and thus support, stabilize, and secure the passenger 12 within the molded contour formed in the seat pan 18.

In an embodiment, the seat pan 18 may be configured to morph to the shape of the passenger 12 using effects of other active materials, such as shape memory materials, piezoelectric materials, electroactive polymers, electrostrictive polymers, ironic polymer gels, or any suitable material having a voltage-dependent plasticity instead of or in addition to the ER fluid 80 or the MR fluid 100. Additionally, the active materials may include a hybrid material with a metal nanostructure and electrolyte and/or a carbon-based (e.g., graphene-based) hybrid material and electrolyte.

Figure 7:
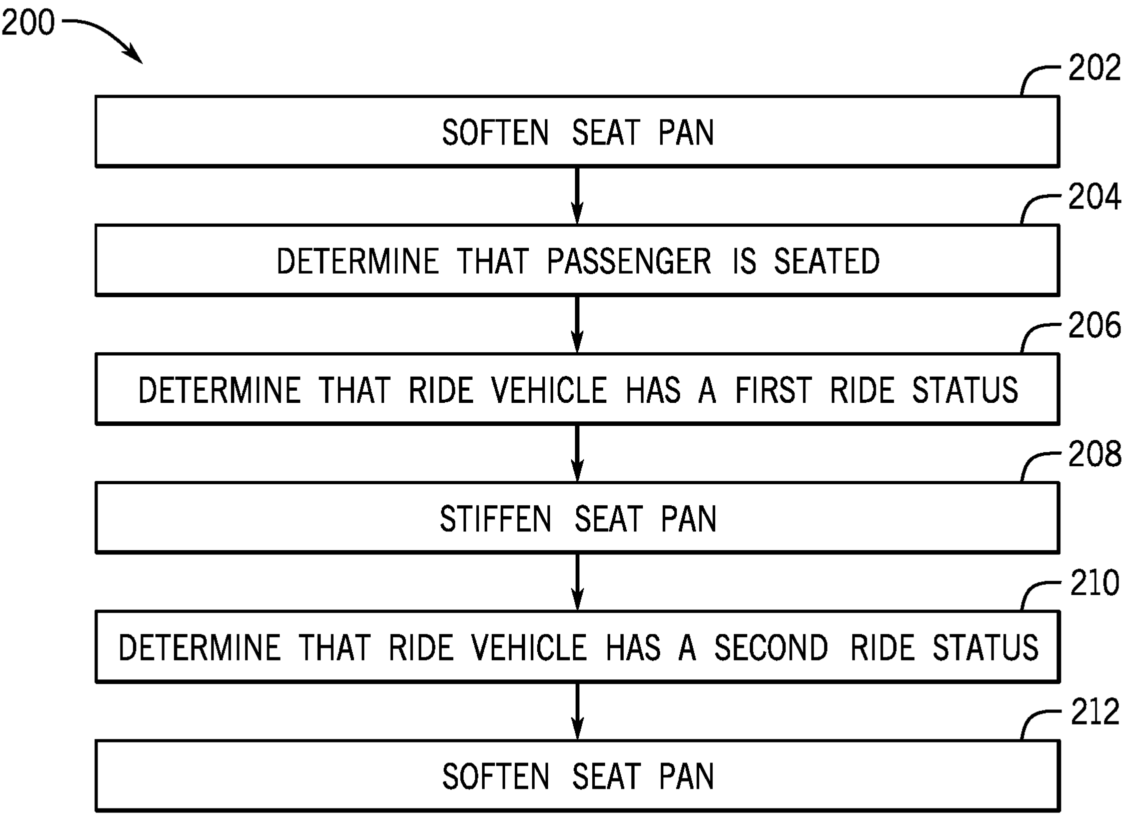
FIG. 7 is a flowchart of a method for controlling a seat pan of a rider engagement system, in accordance with aspects of the present disclosure.

FIG. 7 is a flowchart of a method 200 for controlling the seat pan 18. The method 200 may be performed as an automated procedure by control circuitry, such as the control system 40, the seat controller 38, the processor 42 of the seat controller 38, the base station controller 48, and/or the processor 50 of the base station controller 48. Instructions for performing the method 200 may be stored in a memory, such as the memory 44 of the seat controller 38 or the memory 52 of the base station controller 48. The method 200 includes various steps represented by blocks. Although the flowchart illustrates the steps in a certain sequence, it should be understood that the steps may be performed in any suitable order and certain steps may be carried out simultaneously, where appropriate. Further, certain steps or portions of the method 200 may be performed by separate systems or devices.

At block 202, the control system 40 may soften the seat pan 18 (e.g., activate the soft state 60). For example, block 202 may be performed before a ride begins and/or before the passenger 12 is seated in the ride vehicle seat 30. In an embodiment, the seat pan 18 may be in the soft state 60 by default (e.g., in a deactivated mode). For example, at block 202, little or no electric field may be generated through the ER fluid 80 of the seat pan 18 of FIG. 5. That is, the controller system 40 may configure the voltage source 86 to generate little or no voltage. A similar technique may be performed with respect to the seat pan 18 using the MR fluid 100, as shown in FIG. 6. That is, the control system 40 may not energize the first electromagnet 106 and the second electromagnet 108 to produce the magnetic field 110. With respect to this step and the following steps, described techniques for controlling the MR fluid 100 via the magnetic field 110 should be understood as analogous to controlling the ER fluid 80 via the electric field 92.

At block 204, the control system 40 may determine that a passenger 12 is seated in the ride vehicle seat 30. For example, the sensor(s) 36 may detect the weight of the passenger 12. Additionally or alternatively, the seat controller 38 may determine that the restraint system 34 is in an engaged position (e.g., lowered, buckled). During block 204, the seat pan 18 is in the soft state 60. Therefore, the seat pan 18 may deform to form a molded contour conforming to the shape of the passenger 12.

At block 206, the control system 40 may determine a ride status of the ride vehicle 14 based on data from the sensor(s) 36, signals between the seat controller 38 and the base controller 48, an operator input, and the like. The ride status may be indicative of a position and/or speed of the ride vehicle 14. Based on the ride status, the control system 40 may control the stiffness of the seat pan 18 (e.g., by controlling the field generator 66). In particular, at block 206, the control system 40 may determine that the ride vehicle 14 has a first ride status during which stiffening of the seat pan 18 is desirable. For example, determining that the ride vehicle 14 has the first ride status may include determining that the ride cycle is about to begin, that the ride vehicle 14 is in motion, and/or that the restraint system 34 is engaged. In an embodiment, determining that the ride vehicle 14 has the first ride status includes receiving an operator input to stiffen the seat pan 18 and/or initialize a ride sequence. In other words, the first ride status may be any condition of the ride system 10 that indicates that it is time to secure the position of the passenger 12 in the ride vehicle seat 30.

At block 208, in response to determining that the passenger 12 is seated and that the ride vehicle 14 is in the first ride status, the control system 40 may stiffen the seat pan 18 (e.g., activate the firm state 62). For example, the control system 40 may energize the first electromagnet 106 and the second electromagnet 108 of the seat pan 18 of FIG. 6 to produce the magnetic field 110. As a result, the MR fluid 100 may become more viscous and/or rigid, causing the seat pan 18 to become rigid in the shape of the contour corresponding to the passenger 12 seated in the ride vehicle seat 30. In this way, the control system 40 may control the seat pan 18 to activate when the ride vehicle 14 is in the first ride status.

At block 210, the control system 40 may again determine the ride status of the ride vehicle 14. This time, the control system 40 may determine that the ride vehicle 14 has a second ride status indicating that the seat pan 18 may be softened. For example, determining that the ride vehicle 14 has the second ride status may include receiving an operator input to soften the seat pan 18 or determining that the ride vehicle 14 is stopped, that the ride cycle is over, and/or that the restraint system 34 is disengaged. The second ride status may be a condition of the ride system 10 that indicates that it is time to release the passenger 12 from the rider engagement system 17.

At block 212, the control system 40 may soften the seat pan 18. For example, the ride cycle may be over after it is determined at step 210 that the ride vehicle 14 has the second ride status. Therefore, the control system 40 is configured to release the stiffened shape of the seat pan 18 to return to the soft state 60. For example, the control system 40 may deenergize the first electromagnet 106 and/or the second electromagnet 108 of the seat pan 18 of FIG. 6 to deactivate the magnetic field 110. As a result, the MR fluid 100 may become less viscous, causing the seat pan 18 to soften. In this way, the control system 40 may control the seat pan 18 to deactivate when the ride vehicle is in the second ride status. Then, as a subsequent passenger 12 sits in the ride vehicle seat 30, the seat pan 18 may conform to the shape of the subsequent passenger 12 to provide a new custom contour to support and secure the body of the subsequent passenger 12. Subsequently, the method 200 may restart at block 202 or block 204.

In an embodiment, the first ride status may indicate that the ride vehicle 14 is in motion, or that the ride vehicle 14 is approaching a particular feature (e.g., a turn, a loop) or event that necessitates stiffening of the seat pan 18. The second ride status may indicate that the factors contributing to the first ride status are not present, and thus, the seat pan 18 may be softened.

Figure 8:
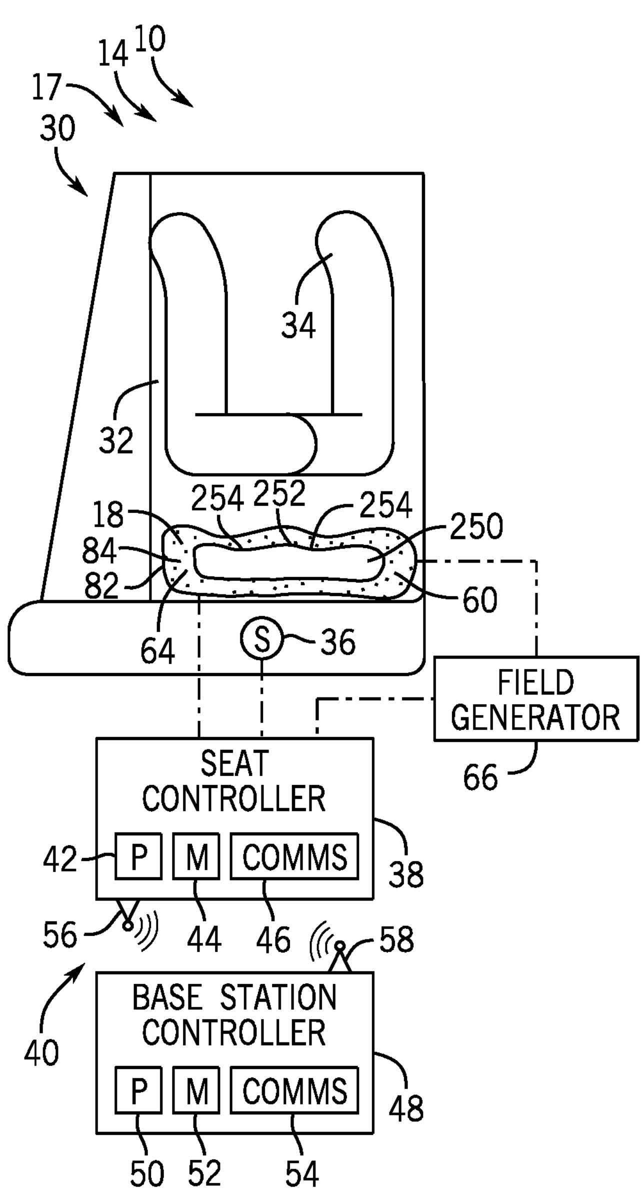
FIG. 8 is a schematic view of an embodiment of a rider engagement system that may be used in the ride system of FIG. 1, wherein a seat pan includes a deformable support, in accordance with aspects of the present disclosure.

FIG. 8 illustrates an embodiment of the rider engagement system 17 in which the seat pan 18 includes a deformable support 250. The deformable support 250 may be a solid structure configured to establish a general shape of the seat pan 18 and cushion the passenger 12, particularly in the soft state 60. The deformable support 250 may be formed from deformable material(s), such as flexible polymers, elastomers, fibers, springs, foams, and/or conformable metamaterials. In an embodiment, the deformable support 250 may be a metal sponge formed from metal filaments (e.g., steel) woven in a desired geometry to define a basic shape of the seat pan 18, as well as to provide a base level of stiffness to support the passenger 12. Moreover, by providing structural support to the seat pan 18 in the soft state 60, the deformable support 250 may enable the seat pan 18 to conform to a default shape when no external pressure is applied to the seat pan 18. The default shape of the seat pan 18 may be at least partially molded or contoured around the deformable support 250. In an embodiment, the deformable support 250 may be disposed within the internal volume 84 of the seat pan 18. Alternatively, the deformable support 250 may be disposed (e.g., coupled) beneath the seat pan 18, such that the membrane 82 rests on the deformable support 250.

Additionally, the deformable support 250 may guide deformation of the seat pan 18 as pressure is applied, as shown in FIG. 3. Indeed, the deformable support 250 may be shaped such that the seat pan 18 deforms in a guided manner to form a generally (e.g., loosely) directed contour over the deformable support 250, as well as beneath the passenger 12. For example, the deformable support 250 may include a pommel feature 252 and concave regions 254 to facilitate (e.g., guide) formation of the pommel 70 and the concavities 72 as the seat pan 18 deforms under weight of the passenger. The deformable support 250 may include the pommel feature 252 and/or the concave regions 254 when no external pressure (e.g., weight of the passenger) is applied to the seat pan 18. Additionally, the pommel feature 252 and the concave regions 254 may remain in the deformable support 250 as external pressure is applied to the seat pan 18. In this way, the seat pan 18 may deform according to a desired pattern based on reaction forces provided by the deformable support 250.

When activated (e.g., in the firm state 62), the active fluid 64 may inhibit deformation of the deformable support 250 immersed therein. For example, viscous flow of the active fluid 64 across surfaces (e.g., filaments) of the deformable support 250 may cause frictional resistance against deformation and/or displacement of the deformable support 250. When the active fluid 64 is deactivated (e.g., in the soft state 60), the deformable support 250 may exhibit a greater tendency to deform as friction is reduced between the active fluid 64 and the deformable support 250 immersed therein. In this way, the active fluid 64 and the deformable support 250 may operate together to provide a comfortable and individualized form of the seat pan 18 to support the passenger.

While only certain features of the subject matter have been illustrated and described herein, many modifications and changes will occur to those skilled in the art. It is, therefore, to be understood that the appended claims are intended to cover all such modifications and changes as fall within the true spirit of the disclosure. It should be appreciated that features described with reference to FIGS. 1-8 may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A ride vehicle system comprising:

a seat configured to support a passenger in a ride vehicle and comprising a seat pan, wherein the seat pan comprises:

a membrane defining an internal volume;

an active fluid disposed within the internal volume; and a deformable support immersed in the active fluid; and a field generator configured to generate an applied field in the active fluid to change a property of the active fluid, wherein the seat pan is configured to deform under a weight of the passenger to form a contour conformed to a shape of the passenger in an absence of the applied field.

2. The ride vehicle system of claim 1, wherein the contour comprises a pommel.

3. The ride vehicle system of claim 1, wherein the seat pan is configured to stiffen in response to exposure to the applied field.

4. The ride vehicle system of claim 1, comprising a control system configured to control the field generator to modulate the applied field to adjust a stiffness of the seat pan.

5. The ride vehicle system of claim 1, comprising a control system configured to control the field generator based on a ride status or a position of the ride vehicle.

6. The ride vehicle system of claim 5, wherein the control system comprises:

a seat controller configured to control the field generator; and a base station controller configured to communicate at least the ride status of the ride vehicle, the position of the ride vehicle, or instructions to control the field generator to the seat controller.

7. The ride vehicle system of claim 1, comprising a control system configured to control the field generator based on acceleration data from an accelerometer on the ride vehicle.

8. The ride vehicle system of claim 1, wherein the active fluid comprises a magnetorheological (MR) fluid, the field generator comprises one or more electromagnets, and the field generator is configured to generate the applied field in the MR fluid by energizing the one or more electromagnets.

9. A ride vehicle system, comprising:

a ride vehicle;

a seat comprising a seat pan configured to support a passenger within the ride vehicle, wherein the seat pan is configured to change plasticity based on a voltage applied to the seat pan, and the seat pan comprises a deformable support immersed in a fluid having a voltage-dependent plasticity; and a control system configured to control the voltage applied to the seat pan.

10. The ride vehicle system of claim 1, comprising:

a sensor supported on the ride vehicle; and a control system configured to:

receive signals from the sensor; and control the field generator to generate the applied field in the active fluid to stiffen the seat pan in response to the signals indicating engagement of a restraint system of the ride vehicle.

11. The ride vehicle system of claim 1, wherein the deformable support comprises a pommel to provide the contour with a pommel feature.

12. The ride vehicle system of claim 1, wherein the deformable support comprises a flexible polymer, an elastomer, a foam, a conformable metamaterial, a metal sponge, fibers, springs, or any combination thereof.

13. The ride vehicle system of claim 9, wherein the fluid comprises an electrorheological (ER) fluid or a magnetorheological (MR) fluid.

14. The ride vehicle system of claim 13, comprising an electric field generator or a magnetic field generator configured to generate an electric field or a magnetic field, respectively, based on the voltage applied to the seat pan.

15. The ride vehicle system of claim 9, wherein the seat pan is configured to transition between a soft state and a firm state based on the voltage applied to the seat pan.

16. The ride vehicle system of claim 15, wherein in the soft state, the seat pan is configured to flexibly conform into a molded contour around a shape of the passenger, and in the firm state, the seat pan is configured to stiffen while maintaining the molded contour.

17. A ride vehicle system, comprising:

a field generator configured to generate an electric field or a magnetic field;

a seat configured to support a passenger in a ride vehicle, the seat comprising a seat pan configured to stiffen in response to exposure to the electric field or the magnetic field and soften in absence of the electric field or the magnetic field, wherein the seat pan comprises a deformable support immersed in a fluid with a viscosity that varies with an intensity of the electric field or the magnetic field; and control circuitry configured to determine a ride status of the ride vehicle system and instruct the field generator to generate the electric field or the magnetic field based on the ride status of the ride vehicle system.

18. The ride vehicle system of claim 17, wherein the control circuitry is configured to determine a presence of the passenger in the seat and instruct the field generator to generate the electric field or the magnetic field based on the presence of the passenger.

19. The ride vehicle system of claim 17, wherein:

the seat pan is configured to transition between a soft state and a firm state based on the absence of or the exposure to the electric field or the magnetic field;

in the soft state, the seat pan is configured to flexibly conform into a molded contour around a shape of the passenger; and in the firm state, the seat pan is configured to stiffen while maintaining the molded contour.

20. The ride vehicle system of claim 19, wherein the ride status is indicative of a position of the ride vehicle, a speed of the ride vehicle, or both.

* * * * *